Feb. 15, 1966 R. P. BERTHIAUME 3,234,708
SEAL-OFF APPARATUS

Original Filed July 3, 1961 4 Sheets-Sheet 1

Richard P. Berthiaume
*INVENTOR.*

BY
Attorney

Richard P. Berthiaume
INVENTOR.

BY
Attorney

Feb. 15, 1966  R. P. BERTHIAUME  3,234,708
SEAL-OFF APPARATUS
Original Filed July 3, 1961  4 Sheets-Sheet 3

Richard P. Berthiaume
INVENTOR.

BY
Attorney

Richard P. Berthiaume
INVENTOR.

United States Patent Office 3,234,708
Patented Feb. 15, 1966

3,234,708
SEAL-OFF APPARATUS
Richard P. Berthiaume, Winchester, Mass., assignor to Arthur D. Little, Inc., Cambridge, Mass., a corporation of Massachusetts
Original application July 3, 1961, Ser. No. 121,440. Divided and this application Apr. 12, 1963, Ser. No. 272,791
1 Claim. (Cl. 53—88)

This application is a division of my copending application Serial No. 121,440, filed July 3, 1961, now abandoned.

This invention relates to method and apparatus for sealing and more particularly to apparatus for sealing a container having established therein a gas pressure different from that of the atmosphere.

There are widespread applications for processes and apparatus which involve altering the gas pressure within a container either to reduce it or to increase it. For example, in insulation it is often desirable to be able to evacuate the insulation surrounding a system to be maintained within certain temperature limits, or to evacuate the area defined by the double walls of a Dewar-type vessel. The seal-off device of this invention is particularly well suited to this latter application.

The control of gas flow and the attending sealing system is of particular importance in making Dewar-type vessels designed to contain quantities of liquefied gases which must, of course, be maintained at extremely low temperatures. Normally, these Dewar-type vessels comprise inner and outer walls having interior surfaces of extremely low emissivities, and defining between them a space which is evacuated down to within a fraction of a millimeter of mercury pressure. Inasmuch as the construction of such vessels places probably the most stringent requirements upon sealing apparatus, this use for sealing devices may be used to discuss the prior art technique and to serve as a framework for describing this invention. It will, however, be appreciated that the seal-off device of this invention is equally adaptable to the evacuation of other systems.

Returning now to vacuum technology, and more particularly to Dewar construction, it is now recognized that all materials which are exposed to the air at atmospheric pressure absorb quantities of gas which must be removed when these materials are used in a low pressure vacuum system. Because of this tendency for materials to retain absorbed permanent gases and condensible vapors, it has been the practice wherever feasible to heat the structure during evcuation in order to outgas the materials as rapidly as possible. If this is not done, these gases and vapors will be liberated slowly as the system is evacuated or after the system has been sealed off, thereby destroying the vacuum that has been achieved.

Throughout the Dewar industry, it has been found that heating of the structure is by far the most effective method for accelerating outgasing. By this means, substantial gains have been made towards shorter pumpdown times and in preventing slow decays in vacuum pressure after pinch-off. In order to allow the Dewar to be heated while evacuating, it is necessary to use a vacuum take-off line and pinch-off device which will withstand the high oven temperatures. Over the years there has evolved the now standard practice of crimping a small copper evacuation tube close to the Dewar shell while pumping down and just after the bake-out period.

The crimping of copper tubing in the sealing method and apparatus of the prior art has a number of inherent disadvantages. The first of these may be ascribed to human errors and results in sometimes achieving less than a positive seal-off, that is sealing is not perfect. The second disadvantage lies in the fact that the copper tubes must be limited to relatively small sizes because of the characteristics of the crimping device. Since the pressure drop in a vacuum take-off line depends upon the fourth power of the line diameter, it becomes apparent that small tube diameters are undesirable.

The copper tube pinch-off process is moreover difficult to handle when re-evacuation becomes necessary after a period of time. In re-evacuation, the vacuum system must be returned to atmospheric pressure which requires the introduction of dry nitrogen gas into the system to prevent the entrance of contaminating condensible vapors. It will be appreciated that it is extremely difficult, if not impossible to break the crimp seal of the copper tube without allowing atmospheric air to enter the system before dry nitrogen gas can be introduced. Finally, the crimped copper tube must be replaced before each evacuation because of the short length of the tube which remains as a result of the previous pinch-off. This generally requires unsoldering the tube from the outer shell and replacing it with a new one. This in turn introduces the possibility of vacuum leaks at other connections and of introducing into the Dewar soldering flux which can be a serious contaminant. Finally, the soft copper tube is susceptible to physical damage and must be handled with great care.

It may be seen from the above description of the use of a copper tube pinch-off system for sealing gas-tight vessels that it would be desirable to have a sealing device which would not exhibit the disadvantages shown by the copper tube. It is, therefore, a primary object of this invention to provide seal-off apparatus for sealing enclosed vessels and the like to form a gas-tight seal, the apparatus being usable over a wide temperature range and reliable in its operation. It is another object of this invention to provide apparatus of the character described which is not limited as to the size of the passage through which gas evacuation is carried out. It is another object to provide sealing apparatus which permits ready re-evacuation including the temporary introduction of dry nitrogen gas, without leaking contaminating gases into the system. It is another object to provide apparatus of the character described which permits a series of resealing without gas leaks in or out of the system. Finally, it is an object to provide seal-off apparatus which is rugged and which does not require special handling. These and other objects will become apparent in the following detailed description of this invention.

I have found that the disadvantages of the prior art process and apparatus may be overcome and that an improved sealing device may be constructed using a fitting and a plug both of which have concentric serrations adapted to receive between them a soft gasket which by pressure can be forced to form a gas-tight seal between them. The fitting and plug are then further sealed by welding or soldering. The invention described herein is directed in particular to apparatus by which the sealing means is applied, and which provides the required gas flow path for evacuation and exerts the pressure needed to effect sealing.

The apparatus and process of this invention can now be more fully described with reference to the accompanying drawings in which FIG. 1 represents a cross-section of a portion of a Dewar-type vessel showing the fitting placed in the outside wall of the vessel;

The drawings illustrate the application of the sealing device of this invention to a Dewar-type vessel. However, the apparatus to be described is equally suitable for sealing gas-tight vessels which are to be evacuated.

Figure 1:
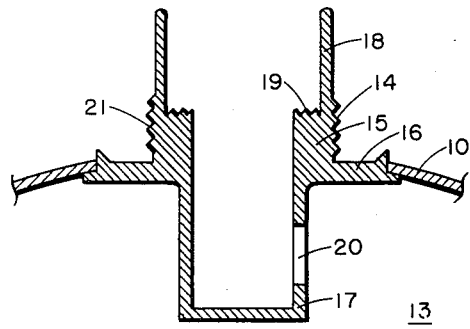

FIG. 1 is a cross section of a small portion of the walls of a Dewar-type vessel represented by outside wall 10 and inside wall 12 which define between them an annular space 13 which is to be evacuated. It will, of course, be appreciated that the Dewar-type vessel may have additional insulation and that the inside surfaces of walls 10 and 12 may be treated to impart low emissivity. However, the overall construction of such a vessel is not part of this invention and any space such as 13 which is to be evacuated can be sealed in the manner described.

Figure 2:
FIG. 2 is a top plan view of the fitting of FIG. 1.
Figure 2:
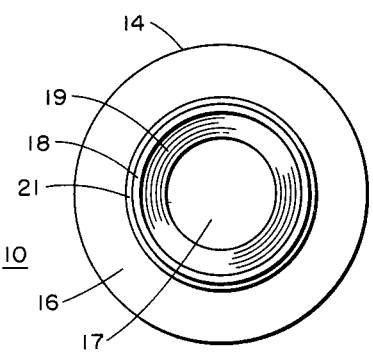

The fitting of this invention, generally indicated by numeral 14 in FIGS. 1 and 2, is affixed in and permanently sealed to a wall of the vessel, in this case wall 10, which defines the outer boundary of the Dewar vessel. This fitting 14 comprises a base 15 which has threads 21 and which has a flange 16 sealed to the outer wall of the Dewar 10; well 17 which extends into the area to be evacuated; and a vertical annular extension 18 having at its base a series of concentric serrations 19 forming an annular ring seat for a gasket. The well 17 is equipped with suitable apertures such as 20 which permit communication with the area to be evacuated.

Figure 3:
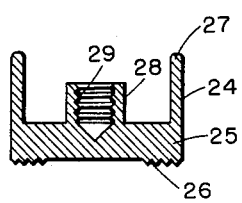
FIGS. 3 and 4 are cross-sectional and top plan views, respectively, of the plug.
Figure 4:
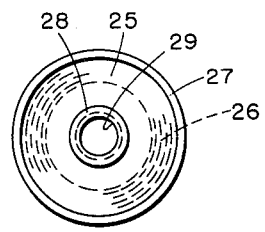

FIGS. 3 and 4 are cross-sectional and top plan views of the plug used in conjunction with the fitting of FIGS. 1 and 2. The plug is generally indicated at numeral 24 and may be seen to comprise a base 25 which has a series of concentric serrations 26 forming around its periphery an annular ring corresponding in size to the annular ring gasket seat formed by the concentric serrations 19 of the fitting (FIGS. 1 and 2). The concentric serrations 19 and 26 may interfit or intermesh with each other, but this is not necessary. Extending upwardly from base 25 of the plug of FIG. 3 is an annular vertical extension 27 which corresponds to extension 18 of the fitting and fits tightly (close but loose) therein. This vertical extension 27 is of a height such that when the plug is placed in the fitting, vertical extensions 18 and 27 will be of equal heights. Finally, the plug (FIGS. 3 and 4) has a central extension 28, having threads 29, which provides a suitable means for extracting the plug after grinding off the seal for re-evacuation.

Figure 5:
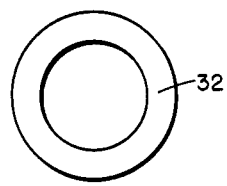
FIG. 5 is a top plan view of a gasket.

FIG. 5 illustrates a top plan view of the annular gasket 32. This annular gasket is formed of a material which is sufficiently soft to permit its being deformed by serrations 19 and 26. The gasket material should also be capable of withstanding the temperatures at which gas transfer and sealing are achieved, and should, moreover, be impermeable to gases that could leak into or out of the system.

Figure 6:
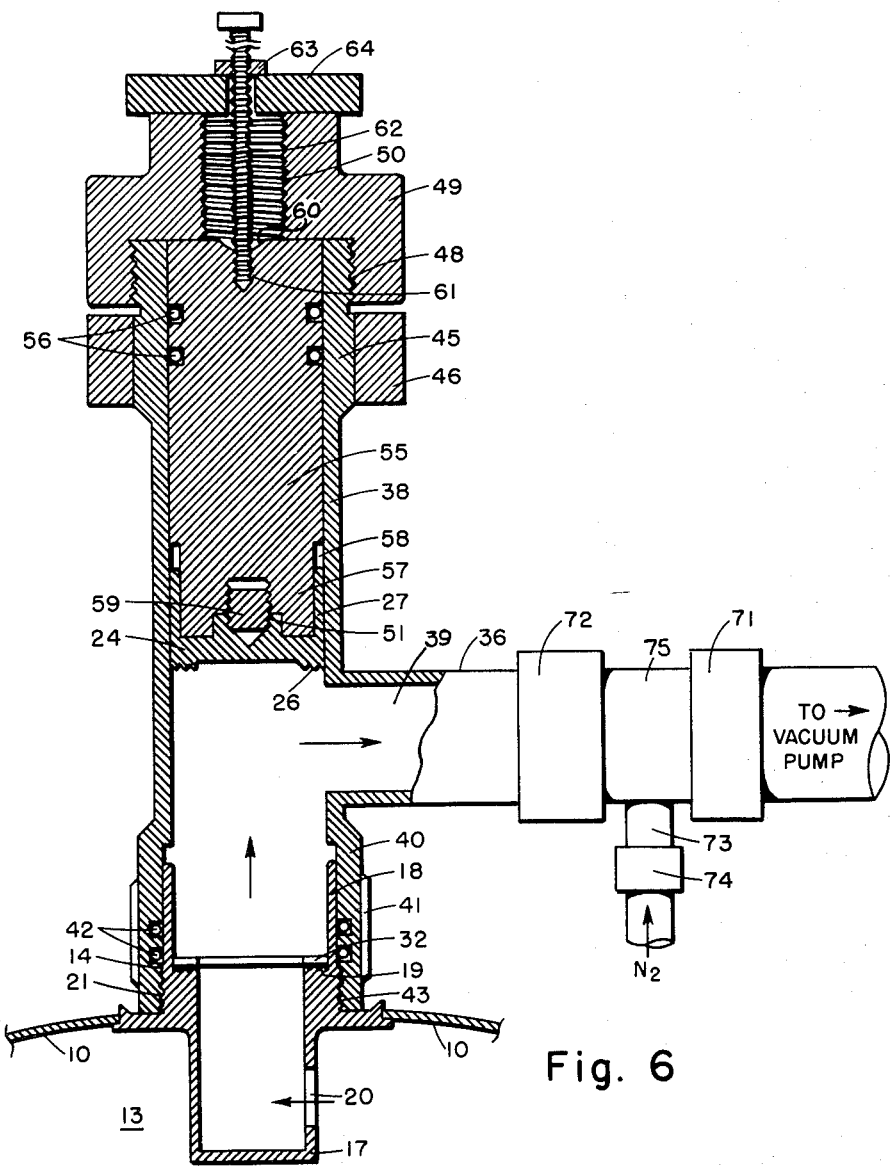
FIG. 6 is a cross-section of the fitting and adaptor showing the position of the elements during evacuation.

FIG. 6 illustrates the use of the adaptor portion of the seal-off apparatus of this invention. This adaptor is generally indicated by numeral 36. In the operation of the seal-off device of this invention, the adaptor 36 is temporarily located in the position illustrated in FIG. 6 and its role is threefold. During the evacuation of the vessel, the adaptor furnishes the necessary path for the gas flow. After evacuation it is used to provide the necessary load to screw the plug in place and complete the first seal; and in re-evacuation it serves as a means for retracting the plug and for introducing dry nitrogen into the system to prevent any condensible gases from leaking in.

In FIG. 6, it will be seen that the adaptor 36 is made up of a main vertical body 38, an evacuation tube 39 which is welded into the adaptor at right angles just about the point where it is screwed onto fitting 16, and an expanded base section 40. Around base section 40 is a reinforcing collar 41, and there are provided suitable O-ring seals 42 adapted to form a gas-tight seal with the wall of the vertical section 18 of fitting 14. The base section 40 has threads 43 so that the adaptor may be screwed onto threads 21 of the vacuum fitting 14. The top of the main vertical body is designed to provide a strong reinforced portion 45 around which is affixed a wrench block 46 of suitable configuration. This reinforced portion 45 at its top is threaded outside with threads 48. A cap 49 fits over and partially closes the adaptor. This cap 49 has threads 50 for receiving a sealing bolt to be described below. Located within and vertically movable in the adaptor in gas-tight relation is a piston 55 fitted with suitable O-ring seals 56 to achieve the required gas-tight seal. The bottom portion 57 of piston 55 is of a smaller diameter than the upper portion, defining between its surface and the inner wall of the adaptor a space 58, the width of which is equal to the thickness of the vertical extension 27 of the plug (FIGS. 3 and 4). Thus this vertical extension 27 fits up between the piston wall and the inner wall of the adaptor. The plug 24 is maintained in fixed relationship to the bottom portion 57 of the piston by an appropriate stud 59, through threads 51. On the top surface of piston 55 is a pressure ball seat 60, adapted to receive pressure applied thereon as will be explained in the description of FIG. 7.

In the process of evacuating space 13 the piston occupies the position indicated in FIG. 6. It will be appreciated that it is necessary to provide means for holding piston 55 in this upper position above the point where evacuation tube 39 enters the main vertical body 38 to allow free flow of the gas. The means for temporarily maintaining piston 55 in its upper position must be strong enough to prevent it from being pulled downwardly during evacuation. As illustrated in FIG. 6 the piston holding means comprises a holding bolt 62 of sufficient length to reach the piston when in its lowermost position (FIG. 7) and adapted to engage the piston through threads 61; a nut 63 by means of which bolt 62 is moved vertically; and a holding plate 64 which rests upon cap 49 and which permits insertion of the holding bolt 62 into the adaptor.

During the evacuation process, the gasket 32 rests on the concentric serrations 19 of the fitting. FIG. 6 also illustrates connections to the evacuation tube 39. Typically, these may consist of a conduit 75 controlled by valve 71, joined to evacuation tube 39 by means of a suitable connection 72 and having a branch conduit 73, controlled by valve 74. Conduit 75 is in turn connected to a vacuum system while branch conduit 73 serves to introduce dry nitrogen into the system during re-evacuation.

If the seal-off device of this invention is to be used in the evacuation of a system which involves heating the system (e.g., up to about 450° F.) the gasket 32 will be formed of a material such as aluminum, annealed copper, or lead which is capable of withstanding the temperature used. Such heating is conveniently done by placing the entire system along with the adaptor in an oven, or the like, and heating is continued until evacuation is essentially complete. The entire system is then removed from the heating means and pumping is continued until seal-off is to be accomplished.

Figure 8:
FIGS. 8 and 9 are detailed illustrations of a portion of the concentric serrations and the gasket before and after application of pressure, respectively, used to effect sealing.
Figure 9:
Figure 7:
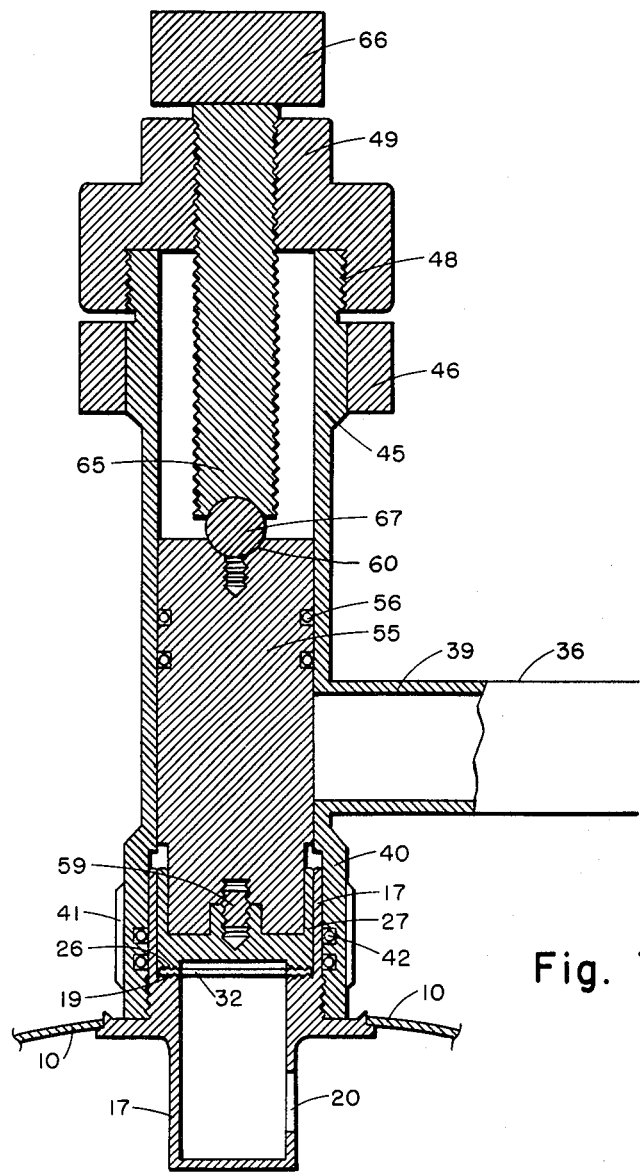
FIG. 7 is the apparatus of FIG. 6 showing the position of the elements during sealing.

In the operation of the seal-off device of this invention, after the evacuation has been completed and while the vacuum pump is still running, the initial seal is formed in the following manner and as illustrated in FIGS. 7–9. Holding bolt 62 is removed by unscrewing and piston 55 is drawn down so that plug 24 slips into fitting 14, concentric serrations 26 resting on gasket 32. Holding plate 64 is also removed and a sealing bolt 65 having a pressure ball 67 (FIG. 7) is screwed into cap 49. The pressure ball 67 engages the pressure ball seal 60 in the upper portion of piston 55. By turning screw 66 which is integral with sealing bolt 65, the bolt 65 engages the piston 55 through the pressure ball seat 60 and pressure is thus exerted on piston 55. Since the plug 24 is attached to piston 55 forcing the piston downward by turning sealing bolt 65 forces the concentric serrations 26 of the plug against the surface of gasket 32 and at the same time forces gasket 32 against the concentric serrations 19 of the fitting. Thus by the application of a predetermined torque to the adaptor bolt 65 a gas-tight seal is formed by deforming gasket 32 to at least partially fill the space between the concentric serrations.

FIGS. 8 and 9 are detailed cross-sectional views of the seal just before application of the final pressure and of the completed seal, respectively. By deforming gasket 32 there is created a zig-zag or sawtooth seal (FIG. 9) which may be seen to produce a labyrinth effect due to the concentric serrations. This type of seal, moreover, creates a much longer leakage path which prevents the gas molecules from forcing their way through the irregular tortuous path of the serrated surfaces. The structure thus realized by this first seal, i.e., the serrations penetrating deeply into the gasket, holds the plug in gas-tight relation with the fitting until the second seal is accomplished.

Simultaneously with the engagement of the serrations 26 and 19 with the gasket 32, the vertical extension 27 of the plug 24 is fitted into the vertical extension 18 of the fitting 14 to form a double-walled ring which is later joined to form a second seal.

Figure 10:
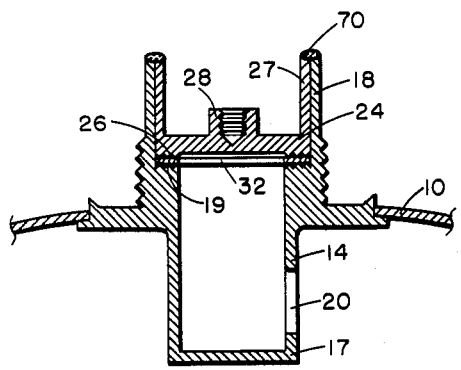
FIG. 10 is a cross-sectional view of the seal formed by the process of this invention.

After the first seal is formed through the gasket, the vacuum pump is shut off and the entire adaptor 36 is removed by unscrewing it from the fitting. The plug and vacuum fitting are then in the position illustrated in FIG. 10 and will be held in place by virtue of the vacuum existing in space 13. Since the gasket 32 has formed an adequate temporary seal, it is then only necessary to join the vertical extensions 18 and 27 by some appropriate method, such as by welding or soldering. The final seal 70, formed along the top of the annular walled extensions, completes the sealing as shown in FIG. 10.

If the seal-off device is to be operated at lower temperatures, e.g., room temperature, the gasket 32 may, of course, be formed of soft, gas-impermeable materials other than metals. For example, a soft, or low molecular weight polyethylene can be used. Other polymeric materials which are impermeable to the gases the flow of which is to be controlled are also suitable.

The seal formed by the soft gasket and the serrated ring seats have been found to be sufficiently tight so that gas flow would not be detected even by mass spectrometer techniques.

It will, of course, be necessary to be able to reevacuate the Dewar-type vessel and this may be accomplished very easily and efficiently by the apparatus of this invention. In order to break the seal 70 (FIG. 10) formed along the edge of the annular ring extensions 18 and 27, the welded or soldered joint is ground off. The stud 59 is then screwed into the central threaded portion of the plug and the piston 55 is attached to the plug through the stud 59. At this point, the adaptor 36 is then screwed onto the fitting 14 over the piston to occupy the position shown in FIG. 7. The holding plate 64 and the holding bolt 61 along with its nut are then put into position as indicated in FIG. 6 and the holding bolt inserted into the adaptor and screwed into the piston by means of threads 61. At this point, valve 71 is opened while valve 74 is kept closed, and the vacuum system is started. After the vacuum system is started, the piston 55 is drawn upwardly by screwing the holding bolt 61 in nut 63. It is, of course, drawn up to the position which it is shown to occupy in FIG. 6. In doing so, the plug 24 which has been affixed to the piston is also withdrawn, and the seal formed by the gasket 32 and the concentric serrations 19 and 26 is broken.

After evacuation, valve 71 is closed and valve 74 is then opened to admit dry nitrogen gas into the system. When sufficient dry nitrogen gas has been admitted, the entire adaptor 36 is unscrewed and removed from the fitting. It will be appreciated that at this point dry nitrogen gas occupies the space 13 preventing the introduction of any contaminating material or condensible gases into this area. After the adaptor has been removed, a new gasket is put into position to rest upon the gasket ring seat formed by concentric serrations 19.

With a new gasket in place, the adaptor is screwed back onto the fitting and re-evacuation is begun by opening valve 71 and pulling a vacuum on the system. The condition at this point is that illustrated in FIG. 6 and it will be appreciated that sealing is then accomplished as described above in connection with the detailed description of FIGS. 6 through 10.

It will be seen from the above discussion that the apparatus of this invention provides an improved seal-off device which achieves an effective gas-tight seal and which at the same time does not place any undue limitations upon the rate of evacuation. Moreover, the seal-off device is particularly well adapted to evacuation at high temperature; and it also provides reliable, efficient and easily operated means for re-evacuation without any of the inherent disadvantages of the prior art apparatus and methods. It will be appreciated that the seal may be broken and resealed many times before the fittings must be replaced, the number of resealings depending upon the height of the vertical extensions. Thus, the seal-off device of this invention is more nearly permanent and is, moreover, more rugged than seals previously used for the same purpose.

Considerable modifications are possible in the various components of the apparatus described without departing from the essential features of the invention and such modifications are considered to be within the scope of this invention.

I claim:

An apparatus for sealing an enclosed space, which is provided with a cylindrical fitting member permanently affixed in fluid-tight relationship to, and projecting through, a wall defining said space and providing communication into said space, and having an internal shoulder intermediate its ends in the form of a flat annular ring seat provided with a first series of concentric serrations; said apparatus comprising an adaptor operably engageable with said fitting member and adapted to fit over the cylindrical exterior surfaces thereof, said adaptor comprising in combination (a) a vertically elongated main body defining therein a cylindrical chamber and being externally threaded at the top;

(b) a cap adapted to be screwed over said top of said elongated main body and having a threaded passage therethrough;

(c) a threaded holding bolt adapted to slip loosely through said cap and to be held thereon;

(d) a threaded sealing bolt adapted to engage the threads of said passage in said cap and to be rotated downwardly in a pressure-applying manner therethrough;

(e) an expanded base in gas-tight fit with said exterior surface of said fitting member;

(f) an evacuation tube communicating with said cylindrical chamber above said expanded base and providing with said fitting member through said chamber a fluid flow path into said enclosed space;

(g) a piston movable within said cylindrical chamber and forming a fluid-tight seal with the wall thereof, said piston arranged on its lower end to hold temporarily and to position a cylindrical plug member, said plug member being provided with a base shoulder having a second series of concentric serrations corresponding to said first series of concentric serrations, and said piston on its upper end being arranged to engage alternately said threaded holding bolt and said sealing bolt whereby said piston when retained in its uppermost position by means of said holding bolt forms a fluid-tight channel between said enclosed space and said evacuation tube, and whereby said piston with said sealing bolt becomes a pressure-applying means adapted to force said plug against a flat annular gasket positioned between said first and second serrations to deform said gasket therebetween and form a fluid-tight seal.

References Cited by the Examiner

UNITED STATES PATENTS

| | | | |
|---|---|---|---|
| 173,093 | 2/1876 | Wells | 53—88 |
| 2,032,862 | 3/1936 | Wilkins | 53—88 X |
| 2,079,055 | 5/1937 | Ward | 53—88 |

TRAVIS S. McGEHEE, *Primary Examiner.*